(12) United States Patent
Hu (10) Patent No.: US 10,146,028 B2
(45) Date of Patent: Dec. 4, 2018

(54) ZOOM/FOCUS DEVICE AND ZOOM LENS (71) Applicant: BOLYMEDIA HOLDINGS CO. LTD., Santa Clara, CA (US)

(72) Inventor: Xiaoping Hu, Guangdong (CN)

(73) Assignee: Bolymedia Holdings Co. Ltd., Santa Clara, CA (US)

( * ) Notice: Subject to any disclaimer, the term of this patent is extended or adjusted under 35 U.S.C. 154(b) by 213 days.

(21) Appl. No.: 15/101,400

(22) PCT Filed: Apr. 18, 2014

(86) PCT No.: PCT/CN2014/075705
§ 371 (c)(1),
(2) Date: Jun. 2, 2016

(87) PCT Pub. No.: WO2015/081651
PCT Pub. Date: Jun. 11, 2015

(65) Prior Publication Data
US 2016/0306136 A1  Oct. 20, 2016

(30) Foreign Application Priority Data
Dec. 3, 2013 (CN) .......................... 2013 1 0636249

(51) Int. Cl.
G02B 15/14 (2006.01)
G02B 7/10 (2006.01)
H02N 2/10 (2006.01)
G03B 3/10 (2006.01)
G02B 15/20 (2006.01)

(52) U.S. Cl.
CPC ............. *G02B 7/102* (2013.01); *G02B 15/20* (2013.01); *G03B 3/10* (2013.01); *H02N 2/10* (2013.01);
(Continued)

(58) Field of Classification Search
CPC .......... G02B 7/102; G02B 15/20; G03B 3/10; G03B 2205/0046; G03B 2205/0084; H02N 2/10
See application file for complete search history.

(56) References Cited

U.S. PATENT DOCUMENTS 6,078,438 A    6/2000  Shibata et al.
6,288,848 B1   9/2001  Shinohara et al.
8,559,120 B2 * 10/2013 Uchiyama .......... G02B 27/0006
                                                359/824

FOREIGN PATENT DOCUMENTS

CN   1873455    12/2006
CN   1983791     6/2007
(Continued)

OTHER PUBLICATIONS

International Search Report for PCT/CN2014/075705 dated Sep. 2, 2014 and its English translation provided by WIPO.
(Continued)

*Primary Examiner* — Alicia M Harrington
(74) *Attorney, Agent, or Firm* — Ladas & Parry, LLP (57) ABSTRACT

A zoom/focus apparatus and corresponding zoom lens assembly are provided. The zoom/focus apparatus may include a first focus lens barrel (101), a first zoom lens barrel (102), a first ultrasonic motor and a second ultrasonic motor which are disposed coaxially. The first focus lens barrel and the first zoom lens barrel are radially unmovable. The caliber of the first zoom lens barrel is larger than that of the first focus lens barrel. The two ultrasonic motors are used to drive the two lens barrels to move axially by the rotation of the rotors (103, 104), respectively. Because the zoom lens barrel which needs to be moved is disposed at outside of the focus lens barrel, by driving the lens barrels using the ultrasonic motors, the telescoping of the zoom lens barrel and the adjusting of the zoom position can be achieved simultane-
(Continued)

ously. Because the zoom lens barrel has larger caliber such that it is suitable for wide-angle lens and the lens assembly becomes gradually larger from inside to outside when the lens group is installed from rear to front, the installing is more convenient and smooth and the miniaturization of the lens assembly is facilitated.

12 Claims, 6 Drawing Sheets

(52) U.S. Cl.
CPC .............. *G03B 2205/0046* (2013.01); *G03B 2205/0084* (2013.01)

(56) References Cited

FOREIGN PATENT DOCUMENTS

| | | |
|---|---|---|
| CN | 101206297 | 6/2008 |
| CN | 101425762 | 5/2009 |
| CN | 101493565 | 7/2009 |
| CN | 102590979 | 7/2012 |
| JP | 2002303775 | 10/2002 |
| JP | 200333054 | 1/2003 |
| JP | 2007306660 | 11/2007 |
| WO | 2007/118418 | 10/2007 |

OTHER PUBLICATIONS

Written Opinion of the International Search Authority for PCT/CN2014/075705 dated Feb. 9, 2014 and its English translation provided by WIPO.

International Preliminary Report on Patentability Chapter I for PCT/CN2014/075705 dated Jul. 7, 2016 and its English translation provided by WIPO.

From CN 101425762, Search Report, retrieved from SIPO dated Mar. 30, 2017.

\* cited by examiner

ZOOM/FOCUS DEVICE AND ZOOM LENS

CROSS-REFERENCE TO RELATED APPLICATIONS

This application is the U.S. National Stage of International Patent Application No. PCT/CN2014/075705 filed on Apr. 18, 2014, which claims priority to Chinese Patent Application No. 201310636249.7 filed on Dec. 3, 2013, the disclosures of which are hereby incorporated by reference in their entireties.

TECHNICAL FIELD

The present disclosure relates to optical technology field, specifically to a zoom/focus apparatus and corresponding zoom lens assembly.

BACKGROUND

With the promotion and popularization of digital imaging technology, optical imaging devices are widely used in a variety of equipments, such as a wide variety of portable and small equipments. Needs for miniaturized optical imaging devices widely exist.

In order to make the imaging devices to have the ability of precisely adjusting the focus in the case of miniaturization, solutions in which a thread-driven ultrasonic motor is used to adjust the focus (for example, referring to the PCT application publication No. WO2007118418) and zoom (for example, referring to the Chinese application publication No. CN102590979A) have been proposed. These technologies can be used to miniaturize the zoom lens assembly. However, there is no feasible solution for telescopic miniaturized zoom lens assembly yet.

Currently, there are, in general, several kinds of telescopic lens as following:

a large lens assembly (such as the lens assembly of a SLR camera) which generally has larger front end caliber and smaller rear end (the end connecting with the camera) caliber, and in which a manual zooming is used to telescope the lens assembly and zoom; and a telescopic lens assembly with the ability of automatic (powered) zooming, which generally has a structure of multi-sleeves and in which the telescoping is performed by the inner sleeve. However, since the inner sleeve has smaller caliber, it is difficult for the telescopic lens assembly to have wide-angle effect. If a wide-angle lens assembly is needed, the multi-sleeves will be stubby, which leads to that the zoom factor will be greatly limited and the dimensions of the rear end of the lens assembly will be further increased.

Both of the two lens assemblies mentioned above are difficult to be miniaturized.

SUMMARY

According to one aspect of the present disclosure, a zoom/focus apparatus is provided. The zoom/focus apparatus may include a first focus lens barrel, a first zoom lens barrel, a first ultrasonic motor and a second ultrasonic motor which are disposed coaxially. The first focus lens barrel may be radially unmovable. A first focus lens group which needs to be moved may be installed in the first focus lens barrel. The first zoom lens barrel may be radially unmovable and have larger caliber than the first focus lens barrel. A first zoom lens group which needs to be moved may be installed in the first zoom lens barrel. The rotation axis of the rotor of the first ultrasonic motor may be coaxial with the first focus lens barrel. The rotor of the first ultrasonic motor may be used to drive the first focus lens barrel to move axially. The rotation axis of the rotor of the second ultrasonic motor may be coaxial with the first focus lens barrel. The rotor of the second ultrasonic motor may be used to drive the first zoom lens barrel to move axially.

According to another aspect of the present disclosure, a zoom lens assembly is provided. The zoom lens assembly may include the zoom/focus apparatus described above and the focus lens group and zoom lens group which need to be moved and are installed in corresponding lens barrels.

In the zoom/focus apparatus according to the present disclosure, the zoom lens barrel with the requirement for telescoping is disposed at outside of the focus lens barrel. The lens barrels are driven by the ultrasonic motors and the rotation movements of the ultrasonic motors are converted into the axial movements of the lens barrels. Thereby the telescoping of the zoom lens barrel and the adjusting of the zoom position can be achieved simultaneously. Because the zoom lens barrel have larger caliber such that it is suitable for wide-angle lens, the zoom lens assembly according to the present disclosure can obtain larger aperture in the case of the same maximum outer diameter compared with the lens assembly in the art which adopts inner telescoping structures. Furthermore, the lens assembly becomes gradually larger from inside to outside when the lens group is installed from rear to front, such that the installing is more convenient and smooth and the miniaturization of the lens assembly is facilitated.

The specific embodiments according to the present disclosure will be described in details in the following with reference to the drawings. For simplicity, the components with substantially the same or similar functions are assigned with the same reference number throughout the embodiments.

DETAILED DESCRIPTION

Figure 1:
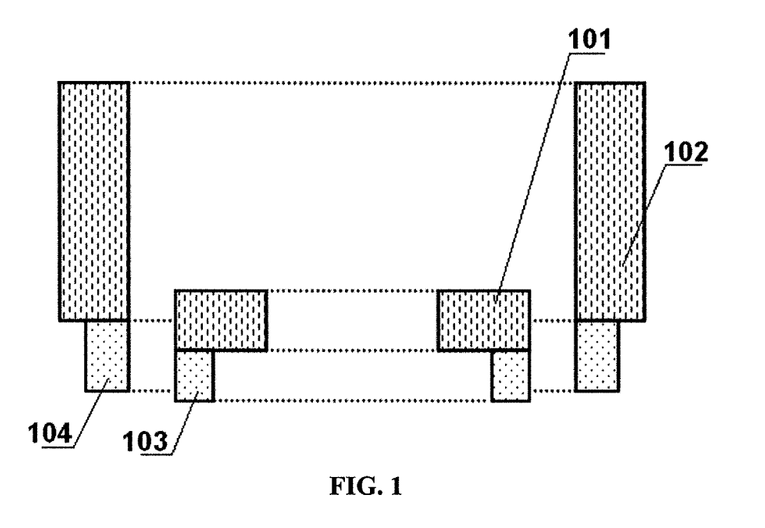
FIG. 1 schematically shows the basic structures of the zoom/focus apparatus according to the present disclosure.

The basic structure of a zoom/focus apparatus according to an embodiment of the present disclosure is shown in FIG. 1, in which upper and lower edges of barrel bodies are shown by dashed lines for simplicity. The zoom/focus apparatus may include a first focus lens barrel 101, a first zoom lens barrel 102, a first ultrasonic motor and a second ultrasonic motor.

The first focus lens barrel 101 may be radially unmovable and a first focus lens group which needs to be moved may be installed in the first focus lens barrel 101. The first zoom lens barrel 102 may be radially unmovable, have larger caliber than the first focus lens barrel, and be disposed coaxially with the first focus lens barrel. A first zoom lens group which needs to be moved may be installed in the first zoom lens barrel 102. The rotation axis of the rotor 103 of the first ultrasonic motor may be coaxial with the first focus lens barrel, and the first focus lens barrel may be driven by the rotor 103 of the first ultrasonic motor to be moved axially. The rotation axis of the rotor 104 of the second ultrasonic motor may be coaxial with the first focus lens barrel, and the first zoom lens barrel may be driven by the rotor 104 of the second ultrasonic motor to be moved axially.

During the optical design of the lens assembly, the axial movement of the first focus lens barrel may be used to achieve auto focus. The axial movement of the first zoom lens barrel may include telescoping of the lens assembly and zooming. The telescoping of the lens assembly herein may refer to bringing the zoom lens group into a region where a normal imaging can be carried out by the movement of the lens barrel. In said region, the zoom factor can be adjusted. In some embodiments, there may be two or more zoom lens barrels in order to achieve multi-stages telescoping. The more forward the zoom lens barrel telescope, the larger its caliber. The zoom lens barrels may be linked, for example, be all driven by the second ultrasonic motor. The zoom lens barrels may also be driven separately. In this case, ultrasonic motors may be disposed accordingly.

In the embodiments, a variety of suitable structures may be used to make the lens barrel radially unmovable. For example, a fixation rod extending axially may be used, which passes through the side wall of the lens barrel and along which the lens barrel can slide axially; or, recesses or protrusions extending axially may be disposed on the side wall of the lens barrel, which may cooperate with corresponding fixation elements to limit the axial movement of the lens barrel. In an embodiment, the radial fixation structure may be further provided with axial limitation elements, such as dam bars or protrusions, etc. which are located at fixed positions, to limit the range of the axial movement of the lens barrel, such as the telescoping range of the zoom lens barrel. In other embodiments, similar limitation mechanisms may be disposed at other fixation structures, or, the rotor driving the lens assembly may be limited, or, the drive mode of the ultrasonic motors may be designed to simultaneously achieve the function of position limitation (described in details below).

Basically, the ultrasonic motor of an embodiment may include a stator and a rotor which are coaxial with and are nested with each other. The stator may be unmovable and the rotor may rotate with respect to the stator. Piezoelectric elements may be attached to the stator or the rotor. The piezoelectric elements may vibrate the stator or the rotor to which the piezoelectric element is attached under excitation of electric signals to generate traveling waves; thereby the rotor may be driven to rotate through the fit (for example, threaded fit, or friction fit of circumferential surfaces) between the stator and the rotor. Since the rotation of the ultrasonic motor can be controlled precisely and the accuracy in the driving of an axial movement can achieve a micron level, the requirements for precise focus/zoom can be satisfied. In an embodiment, a polyhedral ultrasonic motor may be used, in which the surfaces of the stator or the rotor to which the piezoelectric elements are attached are polyhedron. The piezoelectric elements may be attached to each face of the polyhedron. A flexible printed circuit (FPC) may be used to bond or weld metal wires to each of the piezoelectric elements to transmit the electric signals exciting the piezoelectric elements. The piezoelectric elements used may be, for example, piezoelectric ceramics.

In the embodiments, a Hall magnetic ring and a Hall sensor may be further provided in order to accurately measure the axial movement of the lens barrel. The Hall magnetic ring may be disposed coaxially with the first focus lens barrel. One of the Hall magnetic ring and the Hall sensor may be fixed at the rotor of the ultrasonic motor, the other may be fixed at the stator of the ultrasonic motor or at the lens barrel driven by the ultrasonic motor. The Hall sensor may output measurement signals which represent the rotation angle of the Hall magnetic ring with respect to the Hall sensor. Actually, the rotation angle is rotation angle of the rotor. Since there is a correspondence between the rotation of the rotor and the axial movement of the lens barrel, the axial moving distance of the lens barrel may be determined by measuring the rotation of the rotor. The measurement data may be sent to a host for related optical calculation and/or control of the movement of the lens barrel. For example, the rotation angle of the rotor of the second ultrasonic motor may be measured and then the multiple of zoom may be calculated so as to display the multiple of zoom to the user, and/or, the host may perform a feedback control on the zoom of the lens assembly using the measurement data to obtain a precise zoom. As another example, the rotation angle of the rotor of the first ultrasonic motor may be measured to facilitate the control of the auto focus performed by the host.

A variety of suitable transmission structures may be used by the rotor of the ultrasonic motor to drive the lens barrel to move axially. Several transmission structures are described by way of examples, which have their respective advantages. In the embodiments, all of the rotors of the ultrasonic motors may use the same transmission structures, or, they may also use different transmission structures based on the actual situations, respectively.

(1) Direct Contact Transmission Structure

In this transmission structure, the trajectory of the rotor is spiral and the surface of the rotor is kept in contact with one end of the lens barrel driven by the rotor such that the spiral movement of the rotor drives the lens barrel to move axially.

The spiral trajectory may be generated through the threaded fit between the rotor and the stator of the ultrasonic motor. For example, the rotor may be disposed within the stator, and the outer wall of the rotor and the inner wall of the stator may be provided with screw threads which cooperate with each other, respectively. Or, the rotor may be disposed outside of the stator, and the inner wall of the rotor and the outer wall of the stator may be provided with screw threads which cooperate with each other, respectively. When the rotor is driven to rotate, the spiral trajectory may be generated by the guidance of the screw threads.

Figure 2:
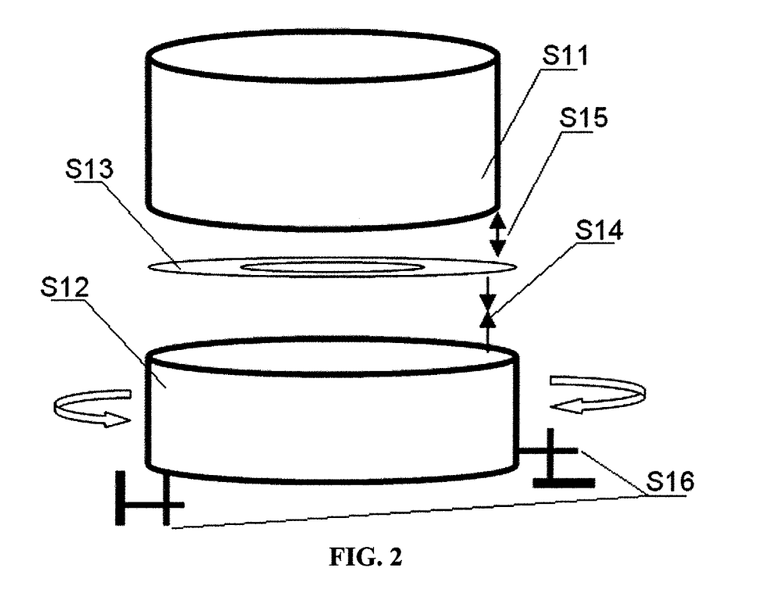
FIG. 2 schematically shows a transmission structure by which the rotor drives the lens barrel.

The contact between the rotor and the lens barrel driven by the rotor may be kept by applying a pre-pressure. The pre-pressure may be provided by a variety of feasible ways. In an embodiment, elastic force of spring may be used. For example, a spring may be used to apply pressure at the end of the lens barrel which is not in contact with the rotor. In another embodiment, magnetic force may be used. For example, referring to FIG. 2, a magnetic ring S13 may be bonded to the end of the lens barrel S11 which is in contact with the rotor S12. The rotor S12 may be made of steel. In the figure, S14 represents the magnetic force, S15 represents the bonding relationship, and S16 is schematic representation of the limitation structures acting on the rotor which limit the rotation of the rotor in two directions by providing dam bars. In this embodiment, the magnetic ring may be regarded as a part of the lens barrel and the magnetic ring being kept in contact with the rotor means the lens barrel being kept in contact with the rotor. In another embodiment, the magnetic ring may be bonded on the rotor and the lens barrel may be made of steel. In the two embodiments mentioned above, if a Hall measurement device is needed, the magnetic ring may simultaneously act as a Hall magnetic ring. In another embodiment, both the lens barrel and the rotor may be made of steel (or, steel ring/iron ring may be bonded to the contact ends, respectively) and a magnetic ring may be inserted therebetween (bonding is unnecessary) to keep the connection between them.

(2) Bump Edge Transmission Structure

In this transmission structure, the trajectory of the rotor is spiral or circular. A support pin extending axially may be fixed to the rotor. The free end of the support pin is kept in contact with one end of the lens barrel being driven. A bump edge may be disposed at the end face of said one end of the lens barrel such that the spiral or circular movement of the rotor may drive the lens barrel to move axially. With the transmission structure, the rotation range of the support pin can be limited by designing the shape of the bump edge of the lens barrel (for example, convex shapes may be disposed at two endpoints of the rotation range to block the movement of the support pin). Therefore, the additional limitation mechanisms of the rotor or the lens barrel may be unnecessary.

Figure 3:
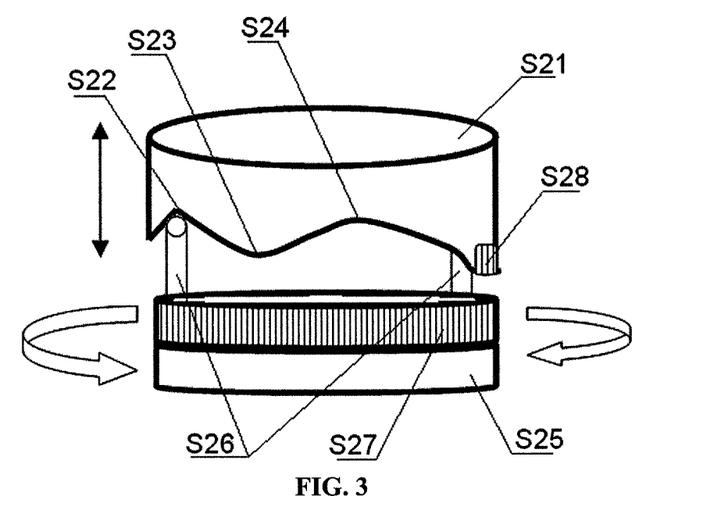
FIG. 3 schematically shows another transmission structure by which the rotor drives the lens barrel.

An example is shown in FIG. 3. An end face of the lens barrel S21 may be provided, according to an optical design, with a bump edge which includes two curves. S22 is the endpoint of the retracting of the lens barrel, S23 is the starting point of the zoom, and S24 is the endpoint of the zoom. The shape of the curve is schematically shown in the figure, and specifically may be determined according to the optical design. Two support pins which are symmetrical with each other may be fixed at the rotor S25. Correspondingly, the bump edge of the lens barrel with which the support pins are in contact may also be symmetrical with each other, which can increase the stability of the whole structure. In addition, in order to measure the movement of the lens barrel, a Hall magnetic ring S27 may be bonded to the surface of the rotor. A Hall sensor S28 may be correspondingly fixed to the lens barrel. The Hall magnetic ring is also used to provide the magnetic link between the lens barrel (made of steel) and the rotor.

(3) Transmission Rod Transmission Structure

In this transmission structure, the trajectory of the rotor is spiral or circular. A first transmission rod extending axially may be fixed to the rotor. The side wall of the lens barrel being driven may be provided with a curved guiding slot. The free end of the first transmission rod may be inserted into the guiding slot such that the spiral or circular movement of the rotor can drive the lens barrel to move axially.

Figure 4:
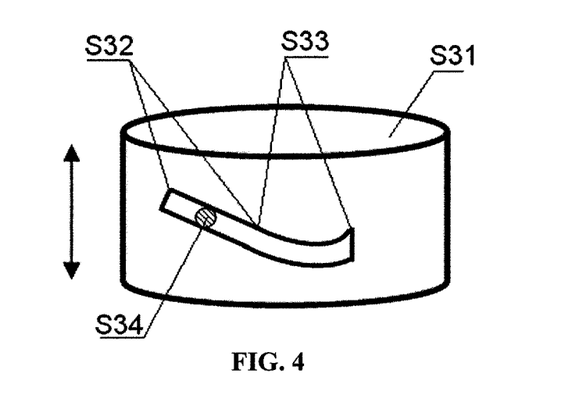
FIG. 4 schematically shows another transmission structure by which the rotor drives the lens barrel.

An example is shown in FIG. 4. The outer wall of the lens barrel S31 may be provided, according to an optical design, with a curved guiding slot, where S32 is a retracting section and S33 is a zoom section. The curve shown in the figure is merely schematic. The upturned portion at the end of S33 indicates that the optical design of the lens assembly has an inflection point. The specific shape of the curve may be determined according to the optical design. The free end S34 of the first transmission rod fixed to the rotor (not shown) may be inserted into the guiding slot. With this transmission structure, because the starting point and the endpoint of the guiding slot can be conveniently set to limit the rotation range of the transmission rod, the additional limitation mechanisms of the rotor or the lens barrel can be unnecessary.

It should be noted that when one rotor needs to simultaneously drive two or more lens barrels (for example, the rotor of the second ultrasonic motor drives two or more zoom lens barrels which are nested with each other), the rotor may utilize the same transmission structures or different transmission structures for the two or more lens barrels. For example, the rotor may drive one lens barrel by direct contact, and at the same time drive another lens barrel which is sleeved outside of said one lens barrel by a transmission rod transmission structure. Or, support pins may be disposed at different radial positions of the rotor and may respectively drive the lens barrels which have calibers corresponding to the positions of the support pins. Or, the rotor may drive one lens barrel by a support pin, and at the same time drive another lens barrel which is sleeved outside of said one lens barrel by a transmission rod transmission structure. Or, the rotor may simultaneously drive two lens barrels which are nested with each other by different transmission rods, respectively.

The zoom lens assembly according to the present disclosure may be obtained based on the zoom/focus apparatus described above, for example, by installing the focus lens group and the zoom lens group which need to be moved into corresponding lens barrels, with the lens group installed being coaxial with the first focus lens barrel. Of course, according to the requirements of the optical design, fixed focus lens group and/or zoom lens group may also be provided, which may be coaxial with the first focus lens barrel as well. In the zoom/focus apparatus described above, the focus lens group at the rear end is located at the innermost location and the zoom lens group which needs to be telescoped is located outside. Therefore, the assemblage of the lens assembly can be performed successively from rear to front and from inside to outside, which facilitates the design and the manufacture of the lens assembly.

The zoom lens assembly according to the present disclosure will be described below with reference to specific embodiments. However, what have already been described in details above, such as the radial fixation of the lens barrel, the limitation structure of the lens barrel or the rotor and the transmission structure of the rotor of the ultrasonic motor to the lens barrel, etc., will not be described again.

Embodiment 1

Figure 5:
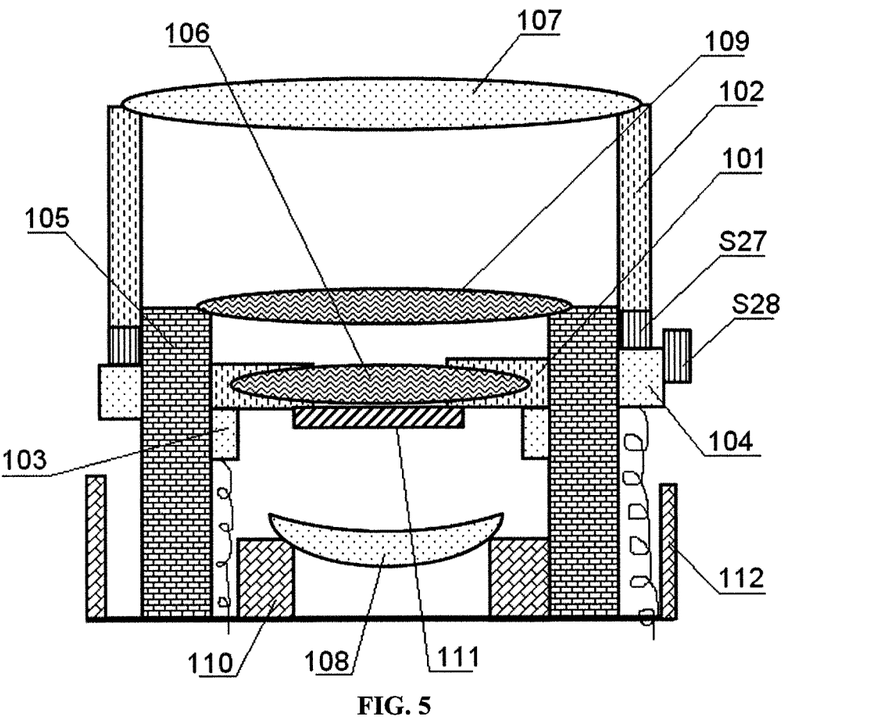
FIG. 5 schematically shows the structure of the zoom lens assembly of embodiment 1.

One embodiment of the zoom lens assembly according to the present disclosure is schematically shown in FIG. 5, which may include a first focus lens barrel 101, a first zoom lens barrel 102, a first ultrasonic motor and a second ultrasonic motor, the structural relationships of which may be as described above. In the present embodiment, the stator of the first ultrasonic motor may be a first fixation barrel 105, the inner wall of the rotor 103 of the first ultrasonic motor may be a polyhedron, piezoelectric element (not shown) may be attached to each side of the polyhedron, and the outer wall of the rotor of the first ultrasonic motor may fit with the inner wall of the first fixation barrel by screw threads or friction. The stator of the second ultrasonic motor may also be the first fixation barrel 105, the outer wall of the rotor 104 of the second ultrasonic motor may be a polyhedron, piezoelectric element (not shown) may be attached to each side of the polyhedron, and the inner wall of the rotor of the second ultrasonic motor may fit with the outer wall of the first fixation barrel by screw threads or friction.

The first focus lens group 106 (shown as single lens in the figure, and hereinafter the same) may be installed in the first focus lens barrel 101. The first zoom lens group 107 may be installed at the front end of the first zoom lens barrel 102. According the optical design, the lens assembly according to the present embodiments may further include a fixed second focus lens group 108 (eyepiece) and a fixed second zoom lens group 109. The second focus lens group may be installed in the second focus lens barrel 110 (since the second focus lens barrel is fixed, it may be disposed together with the first fixation barrel, or may also be a separate barrel, and it may be fixed on the base together with other fixation elements, where the base is represented by the horizontal line at the bottom in the figure). The second zoom lens group may be installed at the front end of the first fixation barrel 105 and be located between the first focus lens group and the first zoom lens group. Usually, a shutter/aperture 111 may be disposed between the first focus lens group and the second zoom lens group.

Figure 6:
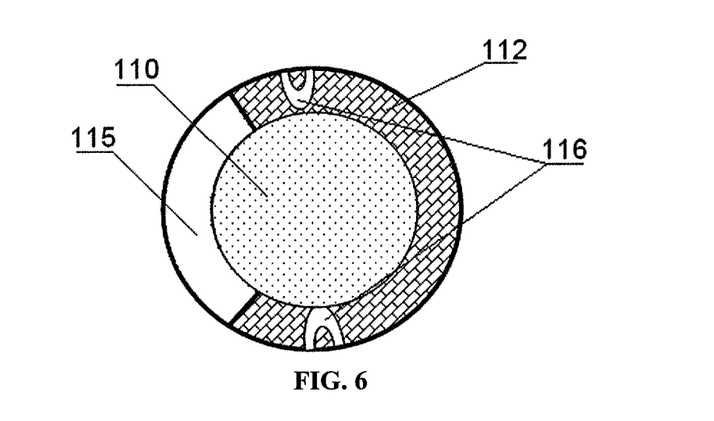
FIG. 6 schematically shows the top view of the second focus lens barrel in embodiment 1.

Because the piezoelectric elements of the two ultrasonic motors are both attached to the rotors, the wires of the FPC connected with the piezoelectric elements will be moved in a certain range with the rotation of the rotor. For the wires connected to the rotor 104, a fixed coil protection ring 112 may be disposed at the periphery of the wires. For the wires connected to the rotor 103, referring to FIG. 6, a hollow area 115 may be disposed at the side wall of the second focus lens barrel 110 for the movement of the wires. In FIG. 6, the through holes 116 may be provided, though which the fixation rod (not shown) may pass. The fixation rod is used for the axial fixation of the lens barrel.

In the present embodiment, Hall effect measurement devices may further be used to precisely measure the axial movement of the first zoom lens barrel 102, where the Hall magnetic ring S27 may be fixed to the first zoom lens barrel and the Hall sensor S28 may be fixed to the rotor 104 of the second ultrasonic motor.

In the present embodiment, the first ultrasonic motor may drive the first focus lens group to perform the auto focus, and the second ultrasonic motor may drive the first zoom lens group to perform the telescoping and zoom of the lens assembly. The two ultrasonic motors share one stator and the two rotors are installed at the inner wall and the outer wall of the stator, respectively, which leads to an extremely compact structure.

Embodiment 2

Figure 7:
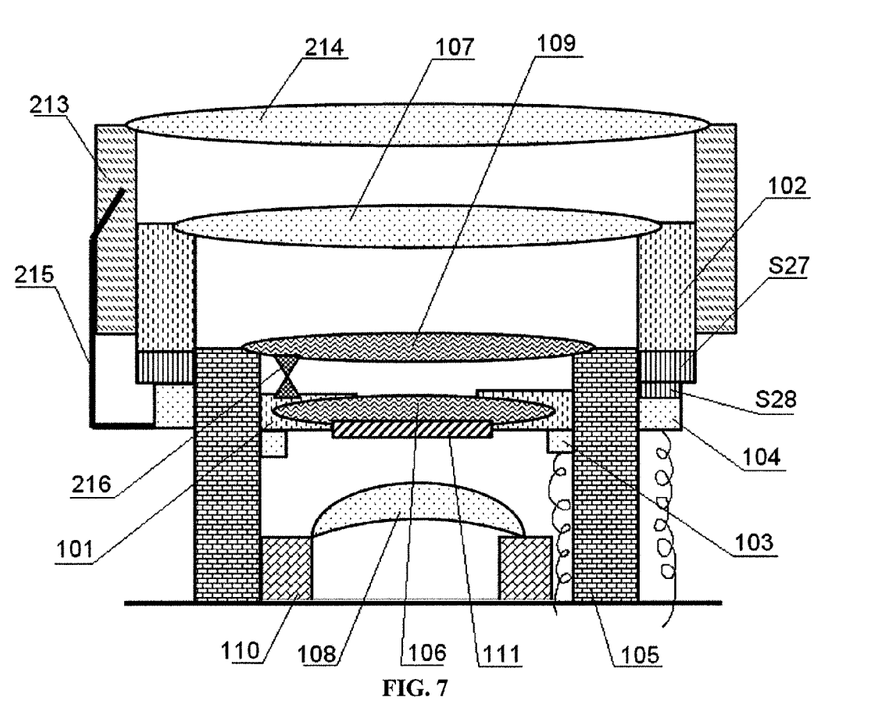
FIG. 7 schematically shows the structure of the zoom lens assembly in embodiment 2.

Another embodiment of the zoom lens assembly according to the present disclosure is schematically shown in FIG. 7, which mainly differs from the embodiment 1 in that another telescopic lens barrel is added.

Specifically, the zoom lens assembly may further include a second zoom lens barrel 213. A third zoom lens group which needs to be moved may be installed in the second zoom lens barrel 213. The second zoom lens barrel may be radially unmovable, have larger caliber than the first zoom lens barrel 102, and be disposed coaxially with the first focus lens barrel. The inner wall of the second zoom lens barrel may abut against the outer wall of the first zoom lens barrel. The rotor 104 of the second ultrasonic motor may further be used to drive the second zoom lens barrel to move axially, for example by a transmission rod transmission structure. A transmission rod 215 extending axially may be fixed at the rotor of the second ultrasonic motor. A curved guiding slot may be provided at the side wall of the second zoom lens barrel. The free end of the second transmission rod may be inserted into the guiding slot such that the spiral or circular movement of the rotor of the second ultrasonic motor drive the second zoom lens barrel to move axially.

In the present embodiment, a tension spring 216 may be disposed to provide pre-pressure for the contact between the first focus lens barrel and the rotor of the first ultrasonic motor. At the same time, the tension spring may also limit the axial movement of the first focus lens barrel, thus the limitation mechanisms acting on the first focus lens barrel or the rotor of the first ultrasonic motor may be omitted.

In the present embodiment, by adding a lens barrel at the outside, the lens assembly may be developed from one stage telescoping to two stages telescoping, which can be implemented by simply providing a driving rod at the rotor of the second ultrasound motor and easy to be achieved. Furthermore, the lens assemblies are increased from four groups to five groups, which facilitates the increase of the zoom factor. And so forth, since it is much easier to add barrel at the outside of the lens assembly than at the inside, multi-stages telescoping lens assembly can be readily obtained by this manner. If it is necessary for the added barrel to be controlled independently, the ultrasonic motor may be added correspondingly.

Embodiment 3

Figure 8:
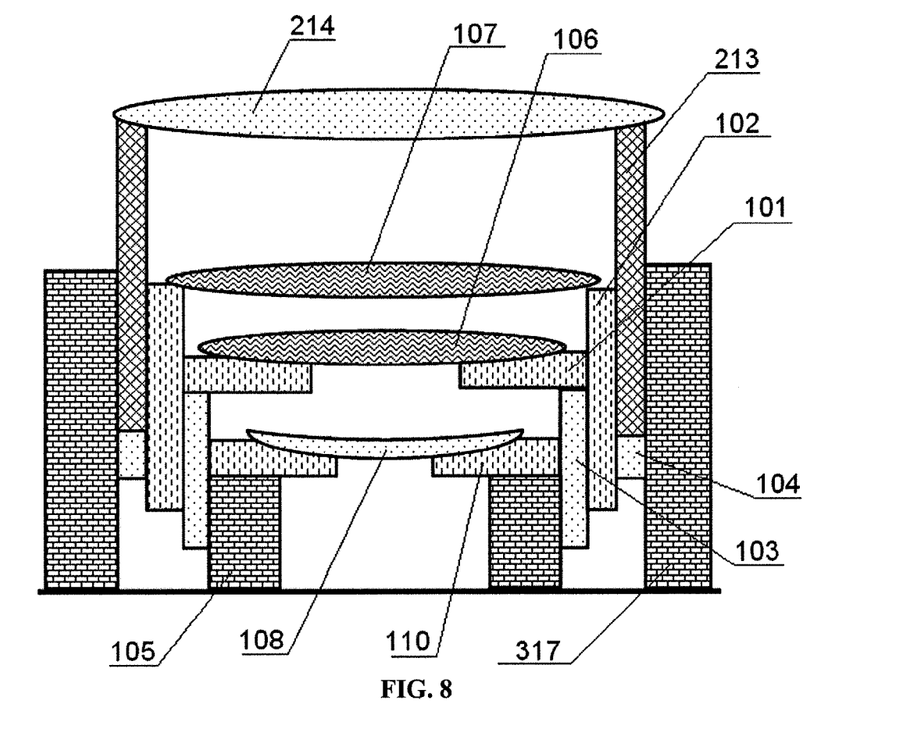
FIG. 8 schematically shows the structure of the zoom lens assembly in embodiment 3.

Another embodiment of the zoom lens assembly according to the present disclosure is schematically shown in FIG. 8, which may include the first focus lens barrel 101, the first zoom lens barrel 102, the first ultrasonic motor and the second ultrasonic motor, the structural relationship of which may be as described above. In the present embodiment, the stator of the first ultrasonic motor is the first fixation barrel 105, the inner wall of the rotor 103 of the first ultrasonic motor may be fitted with the outer wall of the first fixation barrel by threads or friction, the inner wall of the first fixation barrel may be a polyhedron, and the piezoelectric elements (now shown) may be attached to each side of the polyhedron. The stator of the second ultrasonic motor may be a second fixation barrel 317. The outer wall of the rotor 104 of the second ultrasonic motor may be fitted with the inner wall of the second fixation barrel by threads or friction. The outer wall of the second fixation barrel may be a polyhedron, each side of which may be provided with piezoelectric elements. The outer wall of the first focus lens barrel and the outer wall of the rotor of the first ultrasonic motor may abut against the inner wall of the first zoom lens barrel.

In the present embodiment, in order to increase the zoom factor, a second zoom lens barrel 213 may further be provided, in which a third zoom lens group 214 which needs to be moved may be installed. The second zoom lens barrel may be radially unmovable, have larger caliber than the first zoom lens barrel 102, and be disposed coaxially with the first focus lens barrel. The rotor 104 of the second ultrasonic motor may also be used to drive the second zoom lens barrel to move axially (for example, by a transmission rod transmission structure). The inner wall of the second zoom lens barrel may abut against the outer wall of the first zoom lens barrel, and the outer wall of the second zoom lens barrel may abut against the inner wall of the second fixation barrel 317.

In the present embodiment, the two ultrasonic motors have their own stators. The two stators switch the two rotors and the two zoom lens barrels therebetween, such that the lens assembly has good coaxiality. Furthermore, the piezoelectric elements are attached to the stators and need not to be moved, which facilitate the manufacture.

Embodiment 4

Figure 9:
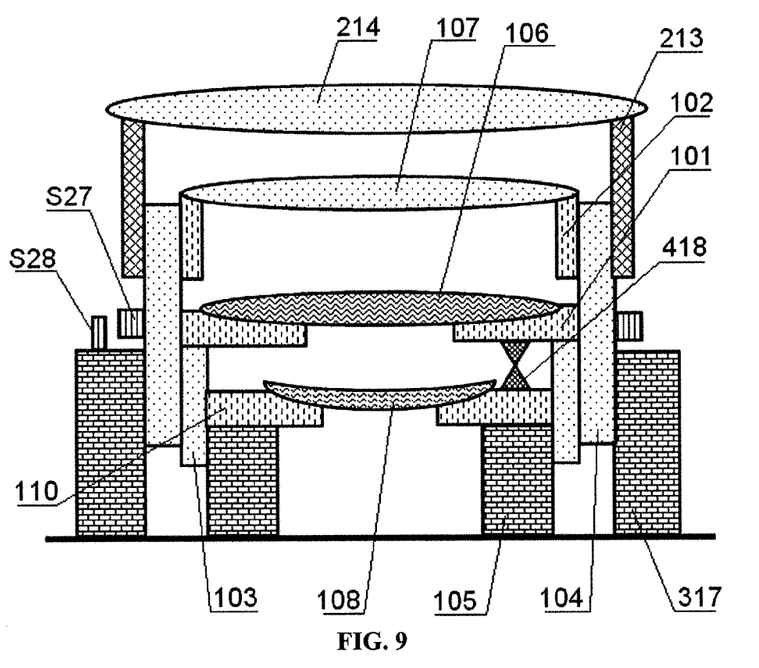
FIG. 9 schematically shows the structure of the zoom lens assembly in embodiment 4.

Another embodiment of the zoom lens assembly according to the present disclosure is schematically shown in FIG. 9, which mainly differs from the embodiment 3 in that the two stators switch only the two rotors therebetween. I.e. the outer wall of the rotor 103 of the first ultrasonic motor abuts against the inner wall of the rotor 104 of the second ultrasonic motor.

In the present embodiment, a tension spring 418 may be disposed to provide pre-pressure for the contact between the first focus lens barrel and the rotor of the first ultrasonic motor. At the same time, the tension spring may also limit the axial movement of the first focus lens barrel, therefore the limitation mechanisms acting on the first focus lens barrel or the rotor of the first ultrasonic motor can be omitted.

In the present embodiment, the structure is more compact and the radial dimensions of the lens assembly are reduced. Furthermore, it is easier to arrange the Hall effect measurement devices to precisely control the zoom. For example, the Hall magnetic ring S27 may be fixed at the rotor 104 of the second ultrasonic motor and the Hall sensor S28 may be fixed at the second fixation barrel 317.

The principles and embodiments have been described above with reference to specific examples. However, it should be understood that the embodiments described above are merely used to facilitate the understanding to the present disclosure, but should not be interpreted as limitations to the present disclosure. A variety of modifications can be made to the specific embodiments described above by a person ordinarily skilled in the art according the concepts of the present disclosure.

What is claimed is:

1. A zoom/focus apparatus, comprising:
   a first focus lens barrel in which a first focus lens group which needs to be moved is installed, wherein the first focus lens barrel is radially unmovable;
   a first zoom lens barrel in which a first zoom lens group which needs to be moved is installed, wherein the first zoom lens barrel is radially unmovable, is nested outside the first focus lens barrel, and is disposed coaxially with the first focus lens barrel;
   a first ultrasonic motor, a rotation axis of a rotor of which is coaxial with the first focus lens barrel, wherein the rotor of the first ultrasonic motor is used to drive the first focus lens barrel to move axially; and
   a second ultrasonic motor, a rotation axis of a rotor of which is coaxial with the first focus lens barrel, wherein the rotor of the second ultrasonic motor is used to drive the first zoom barrel to move axially;
   wherein a stator of the first ultrasonic motor is a first fixation barrel, an inner wall of the rotor of the first ultrasonic motor is a polyhedron each side of which is attached with a piezoelectric element, and an outer wall of the rotor of the first ultrasonic motor is fitted with an inner wall of the first fixation barrel by threads or friction; and
   a stator of the second ultrasonic motor is the first fixation barrel, an outer wall of the rotor of the second ultrasonic motor is a polyhedron each side of which is attached with a piezoelectric element, and an inner wall of the rotor of the second ultrasonic motor is fitted with an outer wall of the first fixation barrel by threads or friction.

2. The apparatus of claim 1, wherein a trajectory of a movement of the rotor of the first ultrasonic motor and/or the second ultrasonic motor is spiral, and a surface of the rotor is kept in contact with one end of the lens barrel driven by the rotor such that the spiral movement of the rotor drive the lens barrel to move axially.

3. The apparatus of claim 2, wherein the rotor is kept in contact with the lens barrel driven by the rotor by magnetic force or spring elastic force.

4. The apparatus of claim 1, wherein a trajectory of a movement of the rotor of the first ultrasonic motor and/or the second ultrasonic motor is spiral or circular, a support pin extending axially is fixed at the rotor, a free end of the support pin is kept in contact with one end of the lens barrel driven by the rotor, and a bump edge is provided at the one end of the lens barrel such that the spiral or circular movement of the rotor drive the lens barrel to move axially.

5. The apparatus of claim 4, wherein the rotor is kept in contact with the lens barrel driven by the rotor by magnetic force or spring elastic force.

6. The apparatus of claim 1, wherein a trajectory of a movement of the rotor of the first ultrasonic motor and/or the second ultrasonic motor is spiral or circular, a first transmission rod extending axially is fixed at the rotor, a curved guiding slot is provided at a side wall of the lens barrel driven by the rotor, and a free end of the first transmission rod is inserted into the guiding slot such that the spiral or circular movement of the rotor drive the lens barrel to move axially.

7. The apparatus of claim 1, further comprising a Hall magnetic ring and a Hall sensor, wherein the Hall magnetic ring is disposed coaxially with the first focus lens barrel, and one of the Hall magnetic ring and the Hall sensor is fixed at the rotor of the ultrasonic motor, the other is fixed at the stator of the ultrasonic motor or the lens barrel driven by the ultrasonic motor; and wherein the Hall sensor outputs measurement signals which represent a rotation angle of the Hall magnetic ring with respect to the Hall sensor.

8. The apparatus of claim 1, further comprising a second zoom lens barrel in which a third zoom lens group which needs to be moved is installed, wherein the second zoom lens barrel is radially unmovable, has larger caliber than the first zoom lens barrel, and is disposed coaxially with the first focus lens barrel;
   and wherein the rotor of the second ultrasonic motor is further used to drive the second zoom lens barrel to move axially.

9. A zoom lens assembly comprising the zoom/focus apparatus of claim 1 and a focus lens group and a zoom lens group which need to be moved and are installed in corresponding lens barrel, wherein the installed lens groups are coaxial with the first focus lens barrel.

10. The lens assembly of claim 9, further comprising a fixed second focus lens group which is installed behind the first focus lens group and is coaxial with the first focus lens barrel; and/or
   further comprising a fixed second zoom lens group which is installed between the first focus lens group and the first zoom lens group and is coaxial with the first focus lens barrel.

11. A zoom/focus apparatus, comprising:
   a first focus lens barrel in which a first focus lens group which needs to be moved is installed, wherein the first focus lens barrel is radially unmovable;

a first zoom lens barrel in which a first zoom lens group which needs to be moved is installed, wherein the first zoom lens barrel is radially unmovable, is nested outside the first focus lens barrel, and is disposed coaxially with the first focus lens barrel;

a first ultrasonic motor, a rotation axis of a rotor of which is coaxial with the first focus lens barrel, wherein the rotor of the first ultrasonic motor is used to drive the first focus lens barrel to move axially; and a second ultrasonic motor, a rotation axis of a rotor of which is coaxial with the first focus lens barrel, wherein the rotor of the second ultrasonic motor is used to drive the first zoom barrel to move axially;

wherein a stator of the first ultrasonic motor is a first fixation barrel, an inner wall of the rotor of the first ultrasonic motor is fitted with an outer wall of the first fixation barrel by threads or friction, and an inner wall of the first fixation barrel is a polyhedron each side of which is attached with a piezoelectric element;

a stator of the second ultrasonic motor is a second fixation barrel, an outer wall of the rotor of the second ultrasonic motor is fitted with an inner wall of the second fixation barrel by threads or friction, and an outer wall of the second fixation barrel is a polyhedron each side of which is attached with a piezoelectric element; and an outer wall of the first focus lens barrel abuts against an inner wall of the first zoom lens barrel, or, the outer wall of the first focus lens barrel abuts against an inner wall of the rotor of the second ultrasonic motor.

12. The apparatus of claim 11, further comprising a second zoom lens barrel in which a third zoom lens group which needs to be moved is installed, wherein the second zoom lens barrel is radially unmovable, has larger caliber than the first zoom lens barrel, and is disposed coaxially with the first focus lens barrel;

and wherein the rotor of the second ultrasonic motor is further used to drive the second zoom lens barrel to move axially.

* * * * *